United States Patent
Zbikowski

(10) Patent No.: US 7,593,222 B2
(45) Date of Patent: Sep. 22, 2009

(54) LAPTOP COMPUTER BAG AND BACKPACK COMPUTER BAG WITH EXTENDABLE TABLE AND POWER SUPPLY

(75) Inventor: Brett Zbikowski, Hinsdale, IL (US)

(73) Assignee: Raven Innovations, Inc., Hinsdale, IL (US)

( * ) Notice: Subject to any disclaimer, the term of this patent is extended or adjusted under 35 U.S.C. 154(b) by 252 days.

(21) Appl. No.: 11/620,377

(22) Filed: Jan. 5, 2007

(65) Prior Publication Data

US 2007/0159781 A1    Jul. 12, 2007

Related U.S. Application Data

(60) Provisional application No. 60/757,179, filed on Jan. 6, 2006.

(51) Int. Cl.
    *G06F 1/16*      (2006.01)

(52) U.S. Cl. .................. 361/679.41; 361/679.59; 206/320; 190/12 A; 280/47.1

(58) Field of Classification Search ............ 206/320, 206/576; 190/10–11, 12 A; 280/47.1; 361/679–687, 361/724–727
See application file for complete search history.

(56) References Cited

U.S. PATENT DOCUMENTS

| | | |
|---|---|---|
| 4,856,627 A | 8/1989 | Polatov |
| 5,437,367 A | 8/1995 | Martin |
| 5,826,770 A | 10/1998 | Chuang |
| 5,871,094 A | 2/1999 | Leibowitz |
| 5,908,147 A | 6/1999 | Chuang |
| 6,036,011 A | 3/2000 | DeCurtis et al. |
| 6,134,105 A | 10/2000 | Lueker |
| 6,454,064 B1 | 9/2002 | Cheng |
| 6,471,019 B1 | 10/2002 | Miller |
| 6,530,475 B1 | 3/2003 | Penney |
| 6,543,796 B1 | 4/2003 | Johnson et al. |
| 6,578,708 B2 | 6/2003 | Barnett |
| 6,597,568 B2 * | 7/2003 | Ryder ................. 361/683 |
| 6,763,942 B1 * | 7/2004 | Yeh ..................... 206/320 |
| 6,772,883 B2 | 8/2004 | Lindamood |
| 6,811,006 B1 | 11/2004 | Mundle |
| 2002/0063072 A1 * | 5/2002 | Pham .................. 206/320 |
| 2002/0112977 A1 | 8/2002 | Barber |
| 2004/0226791 A1 | 11/2004 | Levy |
| 2005/0098402 A1 | 5/2005 | Cohen |

* cited by examiner

*Primary Examiner*—Hung V Duong
(74) *Attorney, Agent, or Firm*—Daniel M. Gurfinkel; Husch Blackwell Sanders Welsh & Katz

(57) ABSTRACT

A laptop computer bag includes a portable workspace, front extendable legs, and rear extendable legs. The portable work space is capable of being extended out from the laptop computer bag by extending the front extendable legs and the rear extendable legs from a collapsed position. The front extendable legs and the rear extendable legs provide support for the portable workspace. The back pack is the same only the workspace the main support wall that would rest on a persons back, with padding (outside of the pack) so the user does not feel the hard surface of the workstation.

18 Claims, 5 Drawing Sheets

LAPTOP COMPUTER BAG AND BACKPACK COMPUTER BAG WITH EXTENDABLE TABLE AND POWER SUPPLY

FIELD OF THE INVENTION

The present invention generally relates to the field of laptop computer bags and, more particularly, to laptop computer bags having a portable work space and power supply.

BACKGROUND OF THE INVENTION

Travelers and commuters have long used backpacks, bags, and luggage to carry a variety of items. As technology has advanced, travelers and commuters have begun to carry laptops and other portable electronic devices for work, personal use, or both. However, space is limited in any bag and most certainly in bags holding laptops. Moreover, many airlines have size limitations for bags and luggage, especially for carry on items. Most traditional laptop bags fit within airline size limitations, but increasing the size of the bag to add additional features or to increase the carrying capacity of the bag would likely cause the bag to increase to a size such that it would exceed the airlines' prescribed size limitations.

When out of the office or not at home many travelers and commuters find using a laptop to be cumbersome because such use often involves balancing the laptop on one's legs or searching for a table or ledge on which to balance the laptop. Furthermore, laptop batteries have a limited life, and many travelers and commuters often find it difficult to find a nearby power source when a laptop battery is low. Accordingly, a need exists for an improved laptop bag. Specifically, there is a need for a laptop bag with a portable workspace and power requirements designed in such a manner that the overall size of the bag is not increased, and the carrying capacity of the bag is not decreased.

BRIEF SUMMARY OF THE INVENTION

One advantage of the present invention is that a portable workspace is integrally attached to a laptop computer bag in such a way that the bag's size is not significantly increased and the bag's carrying capacity is not significantly decreased. The present invention comprises, for example, a portable workspace that extends out from a bag. When the portable workspace is pulled out from the bag, front and rear extendable legs are deployed into an upright position to support the portable workspace.

A second advantage of the present invention is that, for example, it provides extended power to electronic devices. For example, a built-in power pack is incorporated into the bag to allow a user to supplement the battery power of the laptop that is carried in the bag. Additionally, a power strip with retractable extension cord provide multiple electrical outlets for other electronic devices. The power strip was built into the top of the retractable table to conserve space, while providing users with the ability to have access to extended power, without having to fully open the table. Additionally the retractable extension cord can be deployed to reach power outlets that are up to 15 feet away and provide greater functionality for retrieving external power without having to place the bag or table in an awkward position in order access that power outlet. The retractable power cord can also be used to charge an optional 3rd party battery which could be contained in the compartment contained in the retractable desk top.

BRIEF DESCRIPTION OF THE SEVERAL VIEWS OF THE DRAWINGS

Various examples of objects, features and attendant advantages of the present invention will become fully appreciated as the same becomes better understood when considered in conjunction with the accompanying drawings, in which like reference characters designate the same or similar parts throughout the several views, and wherein:

FIG. 4—Item 230 Shows the power strip contained within the frame of the portable workspace. Also show in FIG. 5B item 122.

DETAILED DESCRIPTION OF THE INVENTION

Figure 1:
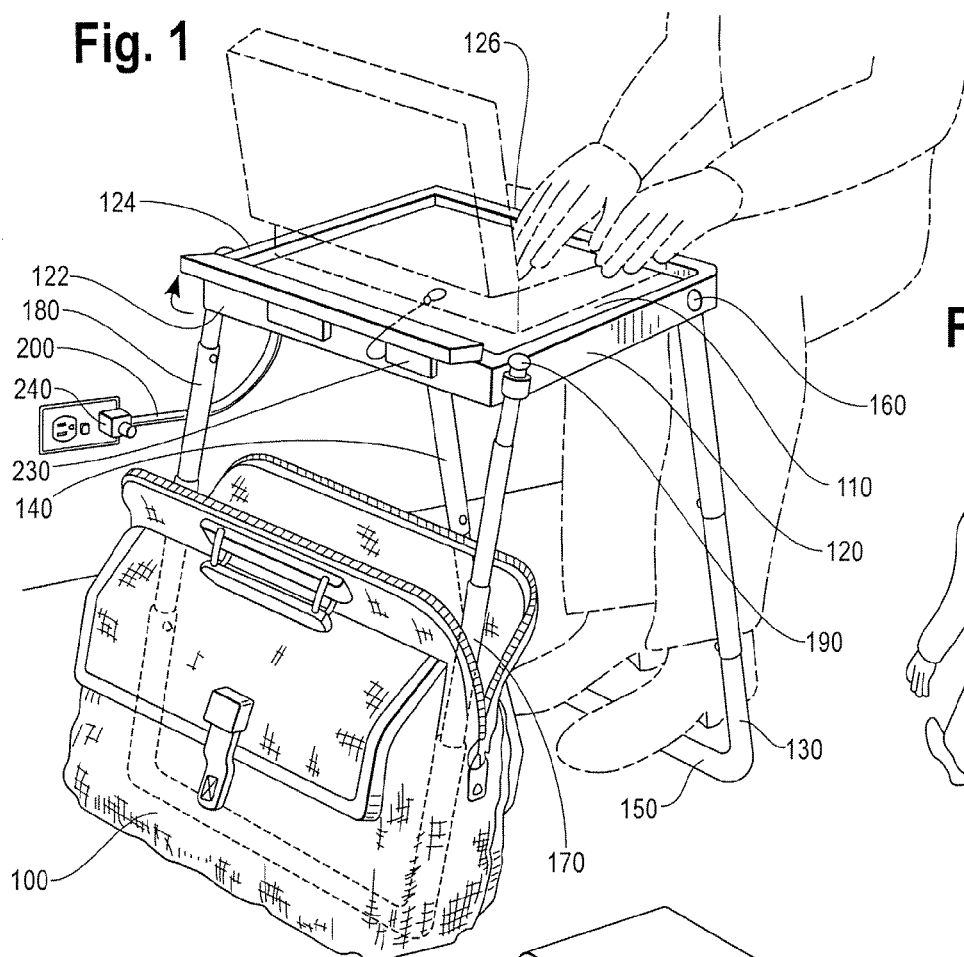
FIG. 1 shows a laptop computer bag with a portable workspace.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should further be understood that the title of this section of this specification, namely, "Detailed Description of the Invention," relates to a requirement of the United States Patent Office and does not imply, nor should be inferred to limit the subject matter disclosed herein.

In the present disclosure, the words "a" or "an" are to be taken to include both the singular and the plural. Conversely, any reference to plural items, shall, where appropriate, include the singular.

FIG. 1 shows a laptop computer bag 100 with a portable workspace 110. One aspect of the present invention is that, for example, a portable workspace 110 extends out from a collapsed position inside of the laptop computer bag 100. In an exemplary embodiment of the present invention, the portable workspace 110 is extended out from inside of the laptop computer bag 100 using extendable legs 130, 140, 170, and 180.

Figure 5A:
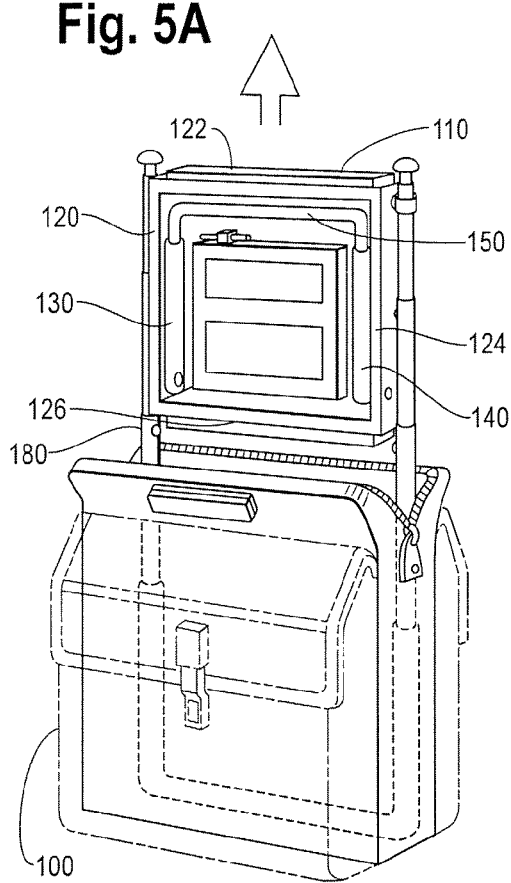
FIG. 5A shows a portable workspace extended out of the laptop computer bag.

FIG. 5A shows a portable workspace 110 extended out of the laptop computer bag 100. When the portable workspace 110 is pulled out of the laptop computer bag 100, the rear extendable legs 170 and 180 can be extended into an upright position as shown. A front extendable legs 130 and 140, and a front center beam 150 are stored within the footprint of the portable workspace 110. If desired, a retractable extension cord 200 and a built-in power source also can be stored within the footprint of the portable workspace 110.

Figure 4:
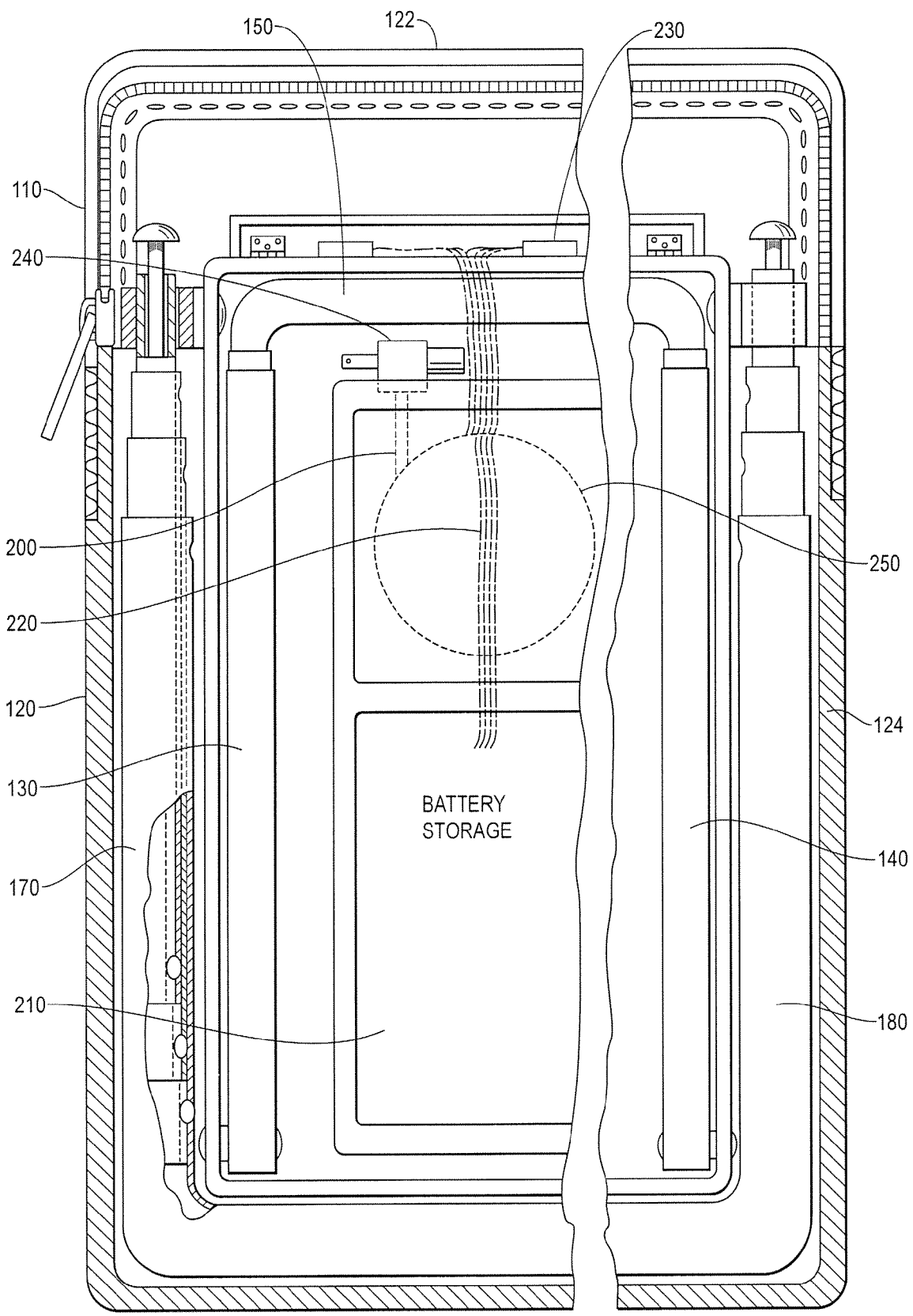
FIG. 4 shows the footprint of the portable workspace when the portable workspace is in a collapsed position.
Figure 5B:
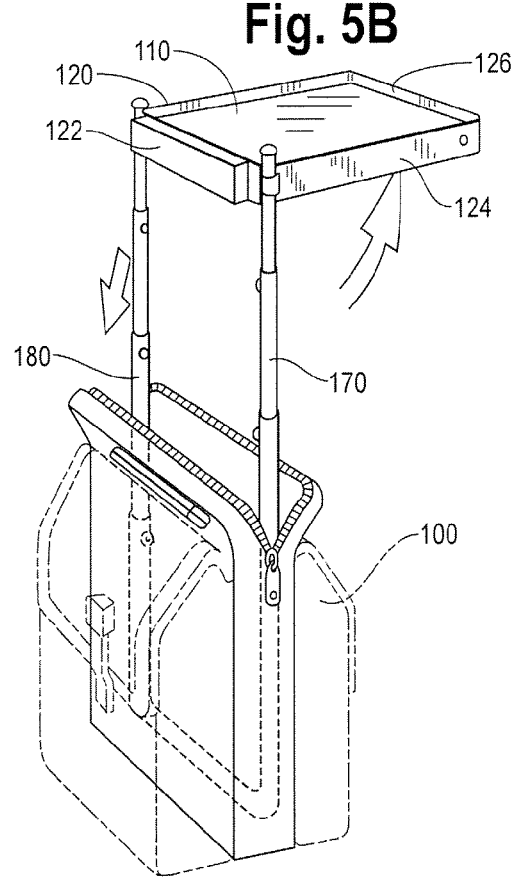
FIG. 5B shows a portable workspace extended out of the laptop computer bag and in a horizontal position.

FIG. 5B shows a portable workspace 110 extended out of the laptop computer bag 100 and in a horizontal position. When the portable workspace 110 is pulled out of the laptop computer bag 100 and the rear extendable legs 170 and 180 are extended into an upright position, the portable workspace 110 can be placed, for example, in a horizontal position that provides a workspace for a user. The portable workspace 110 provides a strong and stable workspace on which users can put, for example, their laptops or other electronic devices. The portable workspace 110 contains, for example, a hard surface and, a built in battery storage and recharging compartment (Power link) for 3rd party batteries which can be re-charged through the retractable extension cord shown in FIG. 4—item 240 & in FIG. 1A item 240. There is a power strip with multiple outlets 230 located within or on the portable workspace 110. Furthermore, the portable workspace 110 contains, for example, side edges 120, 122, 124, and 126 to form a hollow footprint area under the portable workspace 110. The footprint of the portable workspace 110 can be designed in such a manner that a retractable extension cord 200, a built in power source 210, front extendable legs 130 and 140, and a front center beam 150 can be stored within the footprint of the portable workspace 110 when the portable workspace 110 is in a collapsed position.

Figure 5C:
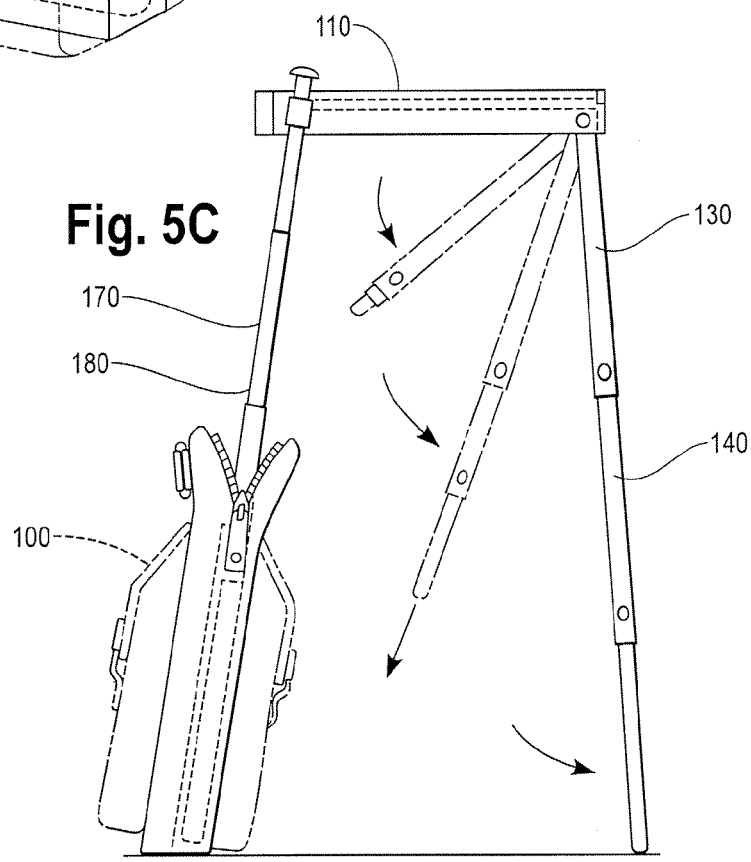
FIG. 5C shows a portable workspace extended out of the laptop computer bag and front extendable legs providing support for the portable workspace.

FIG. 5C shows a portable workspace 110 extended out of the laptop computer bag 100 and front extendable legs 130 and 140 providing support for the portable workspace 110. When the portable workspace 110 is extended out of the laptop computer bag 100, the rear extendable legs 170 and 180 are extended into an upright position, and the portable workspace 110 is placed in a horizontal position, the front extendable legs 130 and 140 can be extended into an upright position. As shown in FIG. 5C, the front extendable legs 130 and 140 can be, for example, extended telescopically.

A user can pull on a front center beam 150 located within the footprint of the portable workspace 110 to remove the front extendable legs 130 and 140 and front center beam 150 from within the footprint of the portable workspace 110 and to telescopically extend the front extendable legs 130 and 140. As shown in FIG. 5C, once fully extended, the rear extendable legs 170 and 180 and the front extendable legs 130 and 140 provide support for the portable workspace 110. The front extendable legs 130 and 140 provide additional stability for the portable workspace 110 when the user places his foot on the front center beam 150 while using the portable workspace 110 as shown in FIG. 1.

Referring to FIG. 1, a rear legs collapse lever 190 is situated in each rear extendable leg 170 and 180, and the rear extendable legs 170 and 180 can be collapsed when the rear legs collapse lever 190 is pressed on both sides. Pressing the rear legs collapse lever 190 releases a locking mechanism in the rear extendable legs 170 and 180, which allows the rear extendable legs 170 and 180 to collapse. A front legs collapse lever 160 is situated within each of the front extendable legs 130 and 140, and the front extendable legs 130 and 140 can be collapsed when the front legs collapse lever 160 is pressed on both sides. Pressing the front legs collapse lever 160 releases a locking mechanism in the front extendable legs 130 and 140, which allows the front extendable legs 130 and 140 to collapse into a retracted state.

Figure 6:
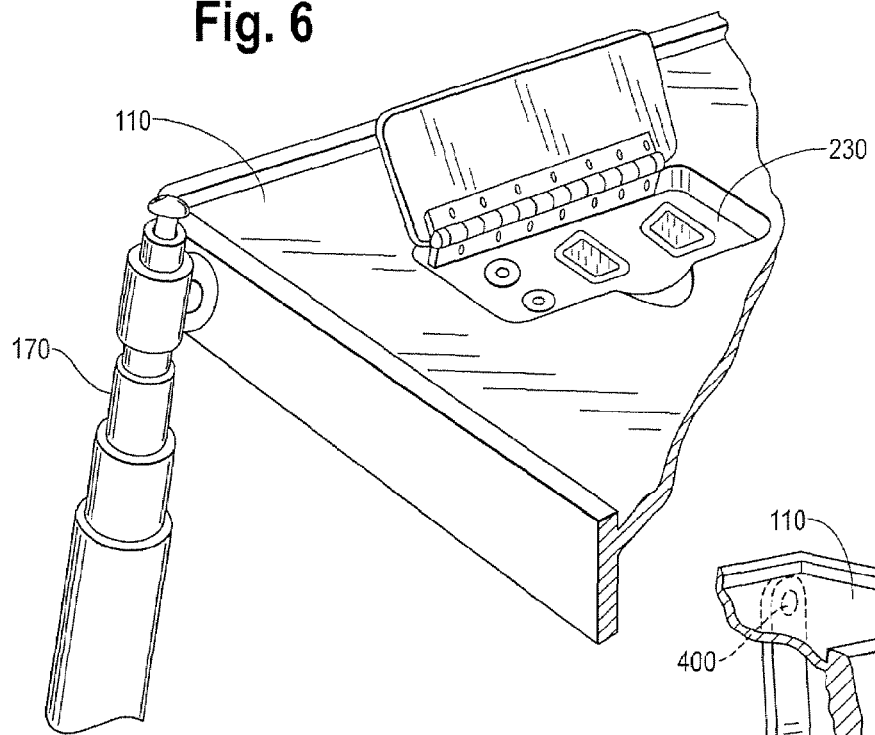
FIG. 6 shows an exemplary of battery storage and recharging compartment located within the portable workspace.

Another aspect of the present invention is that it provides extended power to electronic devices that require electricity such as, for example, laptop computers, cell phones, PDAs, handheld video games, etc. In one embodiment of the present invention, the portable workspace 110 has a built in power strip 230. FIG. 6 shows an exemplary power strip 230 located within the portable workspace 110. The power strip 230 can support, for example, up to four power cords. The power strip can be accessed without having to fully deploy the workstation since it is positioned in it's retracted state so that the power strip is easily accessed by unzipping the top of the bag. The strip immediately on top. FIG. 4 shows the footprint of the portable workspace 110 when the portable workspace 110 is in a collapsed position. The power strip 230 is wired via a power link 220 to a built in power source 210, which is located within the footprint of the portable workspace 110.

A retractable extension cord 200 is also located within the footprint of the portable workspace 110, and the retractable extension cord 200 has, for example, an AC/DC power adapter 240. Both AC and DC power adapters 240 allow the retractable extension cord 200 to consume power from either a car lighter outlet or any standard AC power outlet. The retractable extension cord 200 can be extended, for example, 15 feet to reach an external power source that may not be in close proximity to the laptop computer bag 100. Furthermore, the retractable extension cord 100 is on a retractable fly wheel 250 that allows the user to extend and retract the retractable extension cord 200 by pulling on the retractable extension cord 200. The retractable extension cord 200 can thus provide electricity to the power strip 230 and the built in power source 210 for recharging purposes. Therefore, electronic devices can receive power via the laptop computer bag 100 by plugging into the power strip 230. Electricity will then flow from either the built in power source 210 (when AC/DC power is unavailable) or from the retractable extension cord 200 (when AC/DC power is available) to an electronic device via the power strip 230.

Figure 1B:
FIG. 1B shows a backpack laptop bag.
Figure 1A:
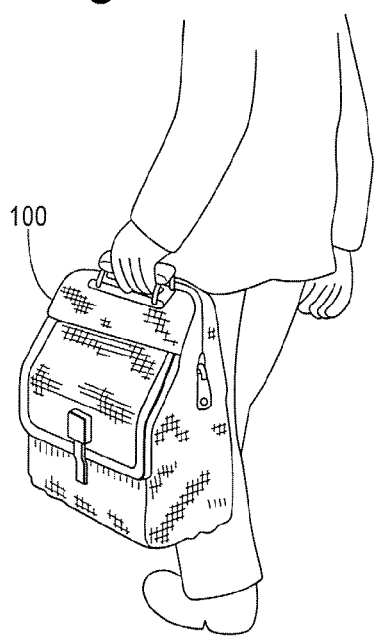
FIG. 1A shows a laptop computer bag with a portable workspace in a collapsed position inside of the laptop computer bag.
Figure 3:
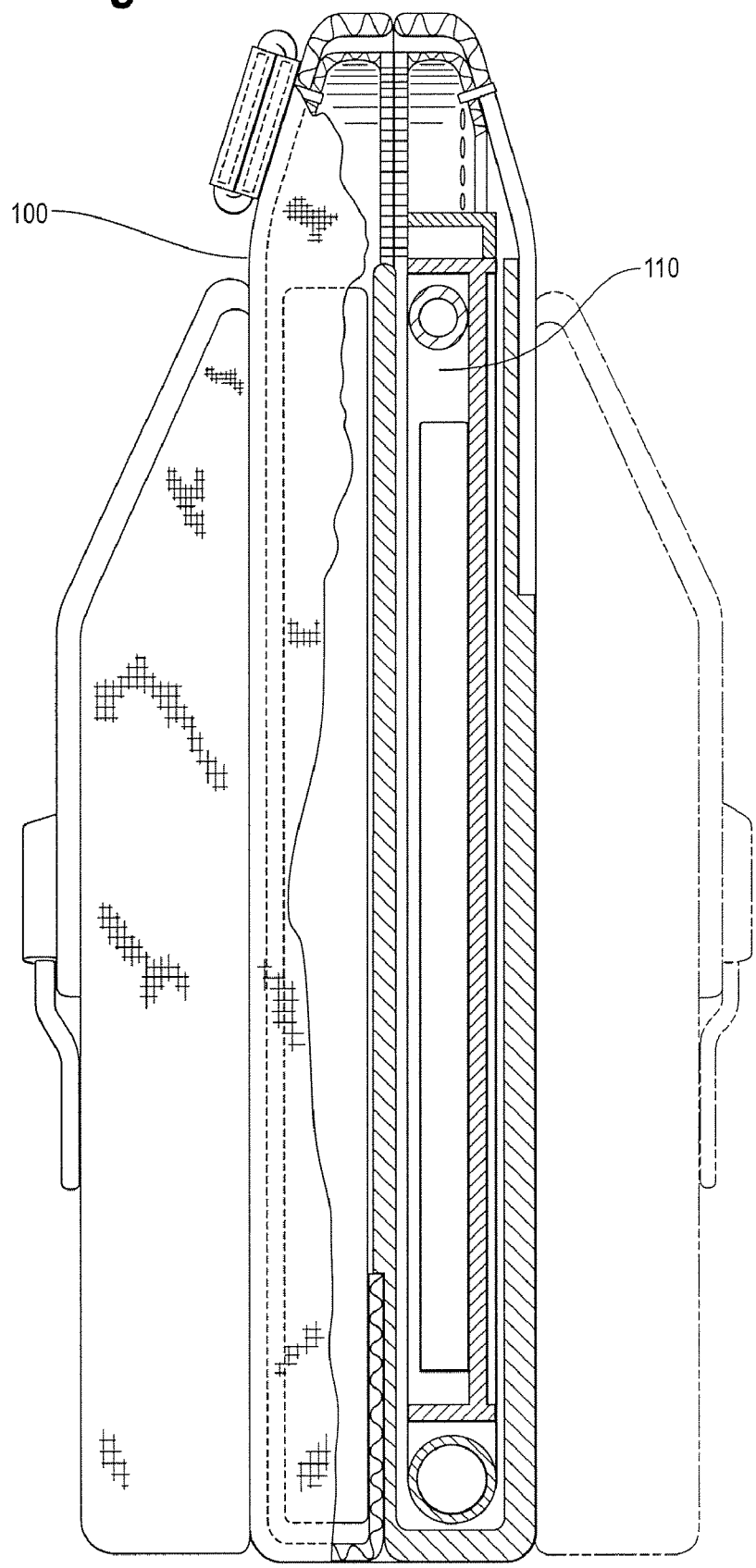
FIG. 3 shows an internal side view of the laptop computer bag when the portable workspace is in a collapsed position.

FIG. 1A shows a laptop computer bag 100 with a portable workspace 110 in a collapsed position inside of the laptop computer bag 100. One aspect of the present invention is that the laptop computer bag 100 is the same size as traditional laptop bags without the novel components as described above. In an exemplary embodiment of the present invention, internal space in the laptop computer bag 100 is conserved when the portable workspace 110 is in a collapsed position. It will also serve as the center support structure for the bag when in its retracted state. FIG. 3 shows an internal side view of the laptop computer bag 100 when the portable workspace 110 is in a collapsed position. The portable workspace 110 can be utilized, for example, as the center support and divider of the laptop computer bag 100. Because the front extendable legs 130 and 140, the front center beam 150, the retractable extension cord 200, and the built in power source 210 are contained within the footprint of the collapsed portable workspace 110, space within the laptop computer bag 100 is conserved. The portable workspace 110 still allows for storage capacity around the portable workspace 110, and the size of the laptop computer bag 100 is the same as that of traditional bags.

Figure 2:
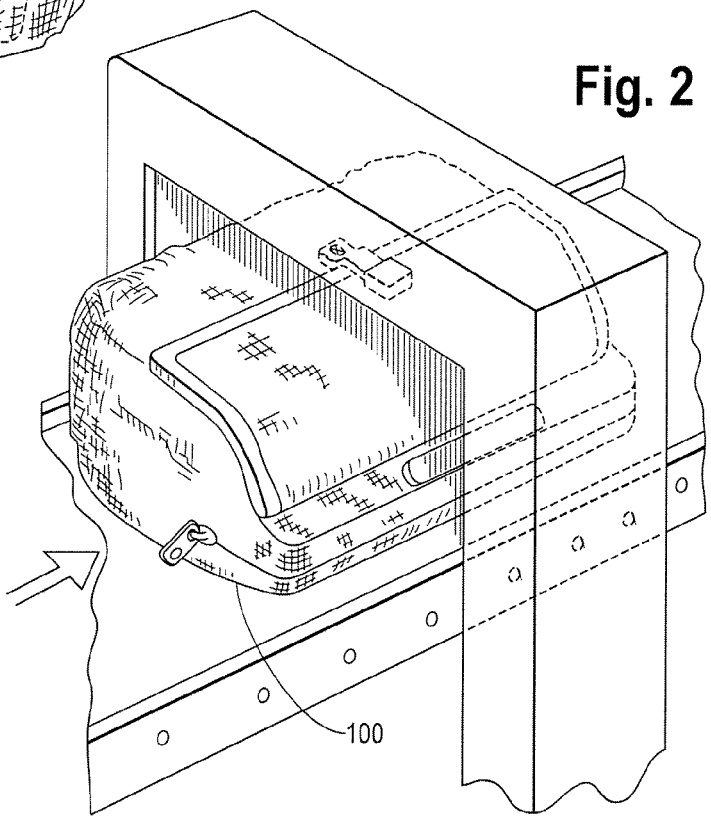
FIG. 2 shows the footprint and size of the laptop computer bag complying with travel and space requirements.

FIG. 2 shows the footprint and size of the laptop computer bag 100 complying with travel and space requirements. In an exemplary embodiment of the present invention, the laptop computer bag 100 is the same size as traditional laptop bags and complies with size and space limitations for traveling.

FIG. 1B shows a backpack laptop bag 300. In a further embodiment of the present invention, a backpack laptop bag 300 houses the same novel components as the laptop computer bag 100 as discussed above. In this exemplary embodiment of the present invention, when the portable workspace 110 is in a collapsed position, the portable workspace 110 is utilized as the main structure and support of the backpack laptop bag 300, which is the wall of the backpack laptop bag 300 that rests directly on the back of the user.

Figure 7A:
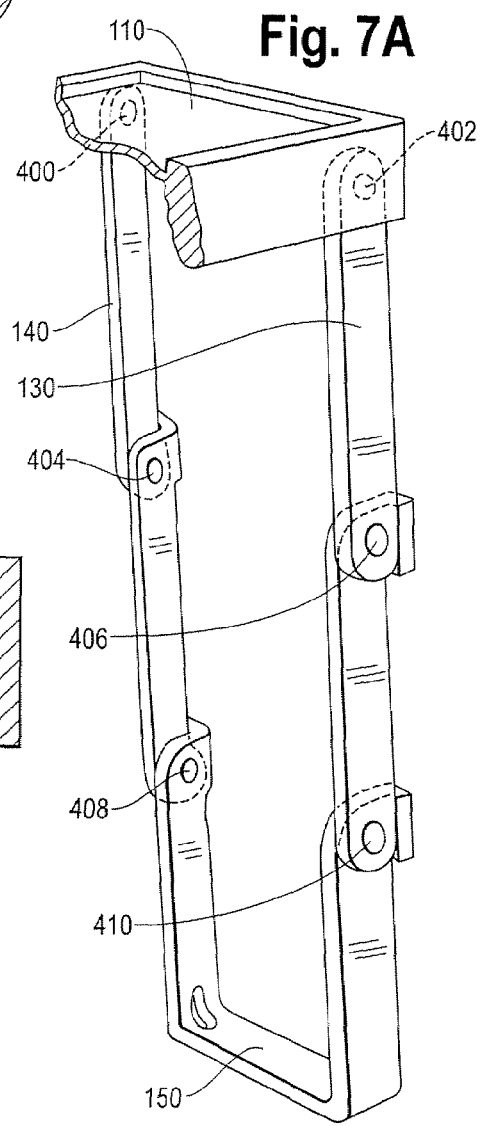
FIG. 7A shows a hinged embodiment of the front extendable legs in an extended position.
Figure 7B:
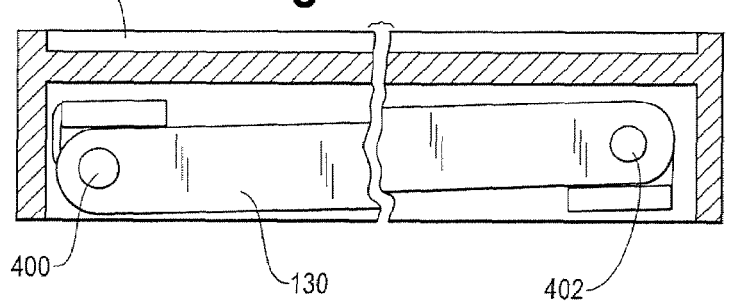
FIG. 7B shows a hinged embodiment of the front extendable legs in a collapsed position.

FIG. 7A shows a hinged embodiment of the front extendable legs 130 and 140 in an extended position. In a further embodiment of the present invention, the front extendable legs 130 and 140 can be extended by the use of hinges 400, 402, 404, 406, 408, and 410. FIG. 7B shows a hinged embodiment of the front extendable legs 130 and 140 in a collapsed position. The front extendable legs 130 and 140 can be folded into a collapsed position using, for example, three hinges 400, 402, 404, 406, 408, and 410 on each front extendable leg 130 and 140. When the user pulls on the front center beam 150, the hinges 400, 402, 404, 406, 408, and 410 rotate to extend the front extendable legs 130 and 140 into an upright position.

Here, the embodiments explained above are given in order to facilitate an understanding of the technical idea of the present invention. They do not restrict the present invention in any way. Therefore, the respective elements disclosed in the aforementioned embodiments are intended to include all design modifications and their equivalents that belong to the technical scope of the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A laptop computer bag comprising:
a portable workspace;
front extendable legs;
rear extendable legs; and
wherein the portable work space is extended out from the laptop computer bag by extending the front extendable legs, using a front center beam, and extending the rear extendable legs from a collapsed position, and wherein the front extendable legs and the rear extendable legs provide support for the portable workspace.

2. The laptop computer bag in accordance with claim 1 wherein the front extendable legs and the rear extendable legs are extended telescopically.

3. The laptop computer bag in accordance with claim 1 wherein the front extendable legs and the rear extendable legs are extended using hinges.

4. The laptop computer bag in accordance with claim 1 wherein a retractable extension cord, a built in power link/source compartment, built in power strip the front extendable legs, and the front center beam are stored within the footprint of the portable workspace.

5. The laptop computer bag in accordance with claim 1 wherein the portable workspace contains a built in power strip.

6. A laptop computer bag in accordance with claim 1 wherein the laptop computer bag complies with travel size requirements.

7. A laptop computer bag in accordance with claim 1 wherein the laptop computer bag is a backpack, and wherein the portable workspace in a collapsed position is a back wall of the backpack.

8. A laptop computer bag comprising:
a portable workspace;
front extendable legs;
rear extendable legs;
wherein the portable work space is extended out from the laptop computer bag by extending the front extendable legs and the rear extendable legs from a collapsed position, and wherein the front extendable legs and the rear extendable legs provide support for the portable workspace; and
wherein the portable workspace contains side edges that form a footprint of the portable workspace.

9. A laptop computer bag comprising:
a portable workspace;
front extendable legs;
rear extendable legs;
wherein the portable work space is extended out from the laptop computer bag by extending the front extendable legs and the rear extendable legs from a collapsed position, and wherein the front extendable legs and the rear extendable legs provide support for the portable workspace; and
wherein rear legs collapse levers are located in the rear extendable legs and the rear extendable legs are collapsed using the rear legs collapse levers.

10. A laptop computer bag comprising:
a portable workspace;
front extendable legs;
rear extendable legs;
wherein the portable work space is extended out from the laptop computer bag by extending the front extendable legs and the rear extendable legs from a collapsed position, and wherein the front extendable legs and the rear extendable legs provide support for the portable workspace; and
wherein front legs collapse levers are located in the front extendable legs and the front extendable legs are collapsed using the front legs collapse levers.

11. A laptop computer bag is accordance with claim 10 wherein a power link, a built in power source, and a retractable extension cord are stored within a footprint of the portable workspace.

12. A laptop computer bag in accordance with claim 11 wherein the retractable extension cord contains an AC/DC power adapter.

13. A laptop computer bag in accordance with claim 11 wherein the retractable extension cord can be extended to reach an external power source.

14. A laptop computer bag comprising:
a portable workspace;
a built in power strip;
a built in power source with a power link;
a battery compartment within the laptop computer bag having a connection to the power link;
a retractable extension cord;
wherein the built in power strip is located in the portable workspace, the built in power strip is wired to the built in power source via the power link and the retractable extension cord is connected to the built in power strip and the built in power source;
wherein the extension cord is capable of providing power to the power strip and the power link so as to charge a battery in the battery compartment; and
wherein retractable extension cord is on a retractable fly wheel, and the retractable extension cord can be extended and retracted by pulling on the retractable extension cord.

15. A laptop computer bag in accordance with claim 14 wherein a built-in power strip provides electricity to an electronic device.

16. A laptop computer bag in accordance with claim 15 wherein the built in power strip receives electricity from a built in power source.

17. A laptop computer bag in accordance with claim 15 wherein the built in power strip receives electricity from a retractable extension cord.

18. A laptop computer bag comprising:
a portable workspace;
front extendable legs;
rear extendable legs;
wherein the portable work space is extended out from the laptop computer bag by extending the front extendable legs and the rear extendable legs from a collapsed position, and wherein the front extendable legs and the rear extendable legs provide support for the portable workspace; and
wherein the portable workspace in a collapsed position is the center support and divider of the laptop computer bag, and wherein storage capacity surrounds the portable workspace in the laptop computer bag.

* * * * *